(12) United States Patent
Hong

(10) Patent No.: US 12,741,460 B2
(45) Date of Patent: Sep. 22, 2026

(54) JIG DEVICE

(71) Applicant: LG ENERGY SOLUTION, LTD., Seoul (KR)

(72) Inventor: Seok-Hyun Hong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 117 days.

(21) Appl. No.: 18/713,027

(22) PCT Filed: Jun. 8, 2023

(86) PCT No.: PCT/KR2023/007869

§ 371 (c)(1),
(2) Date: May 23, 2024

(87) PCT Pub. No.: WO2023/239180

PCT Pub. Date: Dec. 14, 2023

(65) Prior Publication Data

US 2025/0018706 A1 Jan. 16, 2025

(30) Foreign Application Priority Data

Jun. 8, 2022 (KR) ........................ 10-2022-0069491

(51) Int. Cl.
*B32B 38/00* (2006.01)
*B65B 13/18* (2006.01)
*H01B 13/012* (2006.01)

(52) U.S. Cl.
CPC ...... *B32B 38/1875* (2013.01); *B32B 38/0004* (2013.01); *B32B 2038/0052* (2013.01); *B65B 13/18* (2013.01); *H01B 13/01281* (2013.01); *Y10T 156/1033* (2015.01)

(58) Field of Classification Search
CPC ..... B29C 53/56; B29C 53/562; B29C 53/566; B29C 53/58; B29C 53/581; B29C 53/60; B29C 53/607; B29C 53/66–70; H01B 13/01272; H01B 13/01281; H01B 13/01263; B65B 13/02; B65B 13/04; B65B 13/16; B65B 13/18; B65B 13/22;
(Continued)

(56) References Cited

U.S. PATENT DOCUMENTS 4,058,427 A * 11/1977 Wilson .................. B65H 81/08
156/934
4,243,447 A 1/1981 Fukuhara
(Continued)

FOREIGN PATENT DOCUMENTS

CA 2465302 C * 1/2011 ............. B29C 53/68
CN 112317660 A 2/2021
(Continued)

OTHER PUBLICATIONS

International Search Report (PCT/ISA/210) issued in PCT/KR2023/007869, dated Sep. 13, 2023.

*Primary Examiner* — Carson Gross
(74) *Attorney, Agent, or Firm* — Birch, Stewart, Kolasch & Birch, LLP

(57) ABSTRACT

A jig device includes a coater configured to coat an outer surface of a workpiece supplied at a constant speed with a coating material; a cutter configured to cut the workpiece; and a taper configured to tape the outer surface of the workpiece.

18 Claims, 13 Drawing Sheets

(58) Field of Classification Search
CPC ....... B65B 13/24; B65B 13/30; B65B 13/305; F16L 55/1686; F16L 58/1063
USPC ....... 100/6, 8, 10, 13–14, 17, 18–24, 25–28; 156/187, 188, 190, 195
See application file for complete search history.

(56) References Cited

U.S. PATENT DOCUMENTS

| | | | | |
|---|---|---|---|---|
| 4,946,528 | A * | 8/1990 | Takahashi ........... | F16L 58/1063 156/499 |
| 5,417,786 | A | 5/1995 | Denman et al. | |
| 2007/0125488 | A1* | 6/2007 | Brisson ................. | B29C 70/088 428/36.3 |
| 2008/0000589 | A1 | 1/2008 | Degawa | |
| 2018/0323418 | A1 | 11/2018 | Uhm et al. | |

FOREIGN PATENT DOCUMENTS

| | | | |
|---|---|---|---|
| EP | 1873102 | A2 | 1/2008 |
| JP | 51-86571 | A | 7/1976 |
| JP | 54-150446 | A | 11/1979 |
| JP | 57-100034 | A | 6/1982 |
| JP | 59-145114 | A | 8/1984 |
| JP | 2-158322 | A | 6/1990 |
| JP | 2002-1200 | A | 1/2002 |
| KR | 10-2006-0040217 | A | 5/2006 |
| KR | 10-0988150 | B1 | 10/2010 |
| KR | 10-1375975 | B1 | 4/2014 |
| KR | 10-2017-0093753 | A | 8/2017 |
| KR | 10-2226492 | B1 | 3/2021 |
| KR | 10-2021-0095254 | A | 8/2021 |
| KR | 10-2288032 | B1 | 8/2021 |
| KR | 10-2295393 | B1 | 8/2021 |
| KR | 10-2022-0001545 | A | 1/2022 |
| KR | 10-2354805 | B1 | 1/2022 |

* cited by examiner

JIG DEVICE

TECHNICAL FIELD

The present disclosure relates to a jig device, and more specifically, to a jig device capable of performing the cutting, coating, and taping processes of a workpiece in an integrated manner. The present application claims priority to Korean Patent Application No. 10-2022-0069491 filed on Jun. 8, 2022, the disclosures of which are incorporated herein by reference.

BACKGROUND ART

In general, a workpiece (e.g., a cable, a tube, a pipe, or the like) is cut directly by an operator without a separate device, or cut by a cutting device.

In addition, the coating process and the taping process of the workpiece are performed directly by an operator without a separate coating device or taping device. In this case, there is a problem that the completeness of the coating process and the taping process is lowered and the production cost is increased.

Specifically, when coating the workpiece, the coating amount of the coating material is not constant according to the skill level of the operator, and thus a product having a non-uniform coating thickness may be manufactured. In addition, when the workpiece is a woven workpiece, the workpiece is unwound during the cutting process, and thus the operator should directly perform the taping process. Accordingly, the completeness of taping for the workpiece is lowered and the production cost is greatly increased.

DISCLOSURE

Technical Problem

The present disclosure is designed to solve the problems of the related art, and therefore the present disclosure is directed to providing a jig device capable of performing the cutting, coating, and taping processes of a workpiece in an integrated manner.

However, technical problems to be solved by the present disclosure are not limited to the above-described problems, and other problems not mentioned herein may be clearly understood by those skilled in the art from the following description of the present disclosure.

Technical Solution

A jig device according to one aspect of the present disclosure for achieving the above-described object includes a coater configured to coat an outer surface of a workpiece supplied at a constant speed with a coating material; a cutter configured to cut the workpiece; and a taper configured to tape the outer surface of the workpiece.

Preferably, the coater may be configured to coat the outer surface of the workpiece with a certain amount of coating material at regular intervals, and the taper may be configured to tape the outer surface of the workpiece with a tape at regular intervals.

Preferably, the coater may be configured to move along the workpiece to coat the outer surface of the workpiece with a coating material.

Preferably, the taper may include a support frame; a pressure roller coupled to the support frame, the pressure roller being configured to press the workpiece so that a tape is taped to the outer surface of the workpiece; and a tape supplier configured to supply the tape to the pressure roller.

Preferably, the pressure roller may include a first roller; and a second roller disposed to face the first roller in a horizontal direction of the workpiece, wherein the first roller and the second roller may be configured to press the workpiece positioned between the first roller and the second roller in the horizontal direction of the workpiece.

Preferably, the support frame may include a first frame, the first frame including an extension portion extending in a vertical direction; and a second frame coupled to the first frame in the vertical direction, the second frame being configured to support the pressure roller, wherein the taper may further include an elastic support provided in a horizontal direction of the workpiece between the extension portion and the second frame, and the elastic support may be configured to elastically support the second frame in the horizontal direction of the workpiece.

Preferably, the support frame may be configured to move in three axial directions of the workpiece.

Preferably, the jig device may further include a clamper configured to fix a position of the workpiece, wherein the coater may be configured to coat the outer surface of the workpiece with a coating material in a state where the position of the workpiece is fixed, and wherein the taper may be configured to tape the outer surface of the workpiece with a tape in a state where the position of the workpiece is fixed.

Preferably, the coater and the taper may be respectively disposed in plurality along the longitudinal direction of the workpiece, wherein a distance between the plurality of coaters may be configured to be mutually adjustable, and a distance between the plurality of tapers may be configured to be mutually adjustable.

Preferably, the jig device may further include a base configured to support the coater and the taper with respect to a ground.

Preferably, the taper may further include a buffer pad provided on an outer surface of the pressure roller.

Preferably, the taper may further include a tension controller configured to adjust a tension of the tape supplied to the pressure roller.

Advantageous Effects

According to the embodiment of the present disclosure, it is possible to perform the cutting, coating, and taping processes of a workpiece in an integrated manner during the process of processing the workpiece, and the work completeness of the workpiece may be improved.

In addition, several other additional effects may be achieved by various embodiments of the present disclosure. The various effects of the present disclosure will be described in detail in each embodiment, or descriptions of effects that may be easily understood by those skilled in the art will be omitted.

DESCRIPTION OF DRAWINGS

The accompanying drawings illustrate a preferred embodiment of the present disclosure and together with the foregoing disclosure, serve to provide further understanding of the technical features of the present disclosure, and thus the present disclosure is not construed as being limited to the drawing.

FIGS. 6 to 8 are views showing a process of taping a workpiece by the taping module of FIG. 4.

FIG. 9 is a view showing a clamping module provided in the jig device of FIG. 1.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
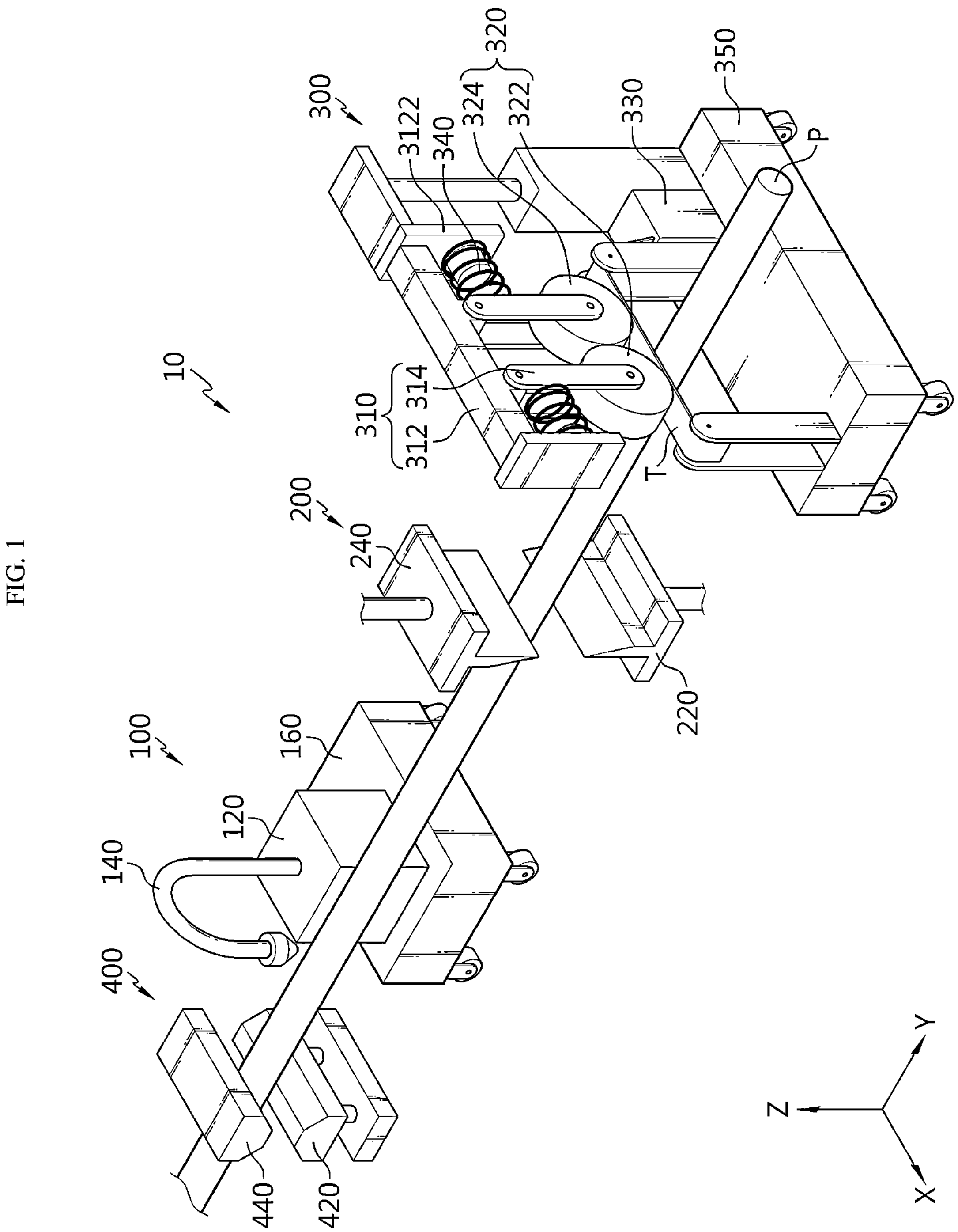
FIG. 1 is a view showing the overall shape of a jig device according to an embodiment of the present disclosure.
Figure 2:
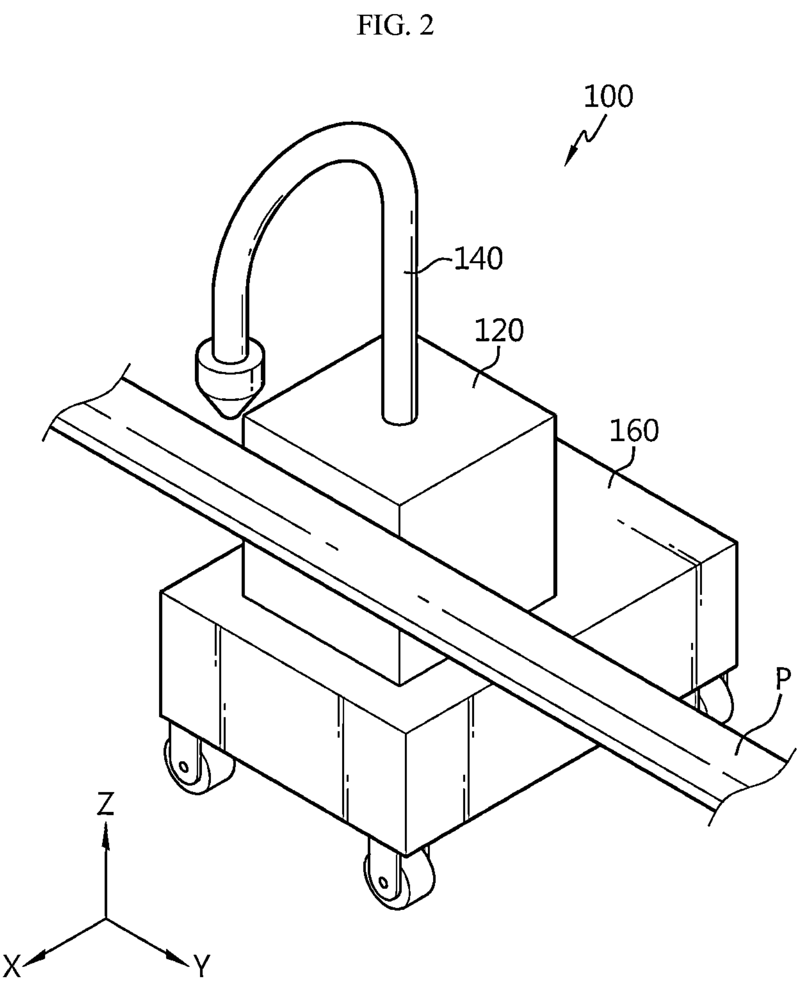
FIG. 2 is a view showing a coating module provided in the jig device of FIG. 1.
Figure 3:
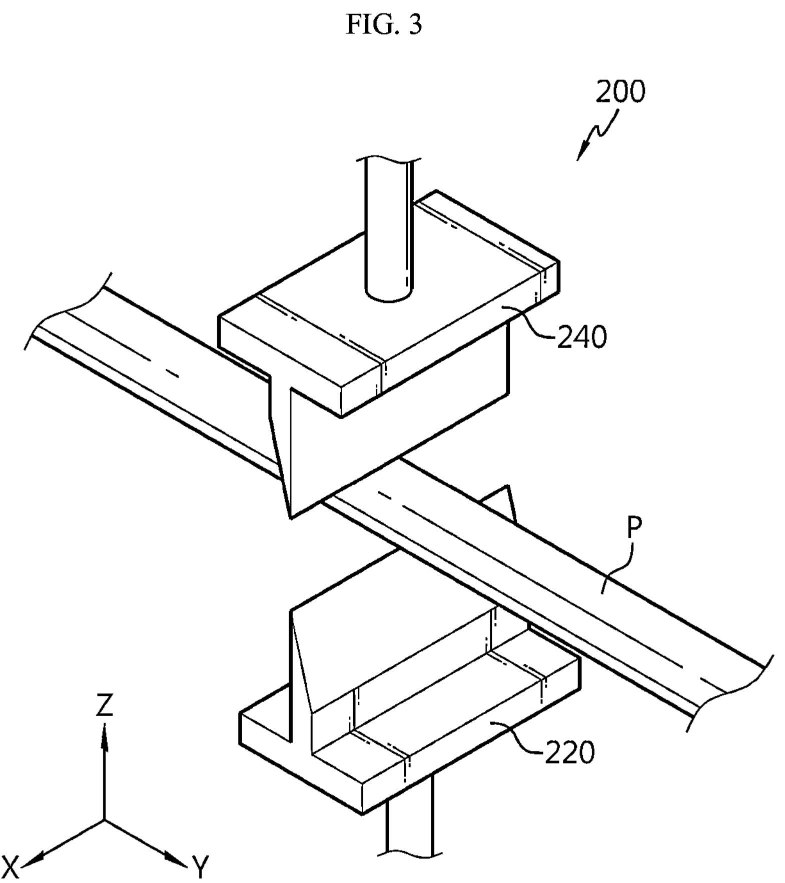
FIG. 3 is a view showing a cutting module provided in the jig device of FIG. 1.
Figure 4:
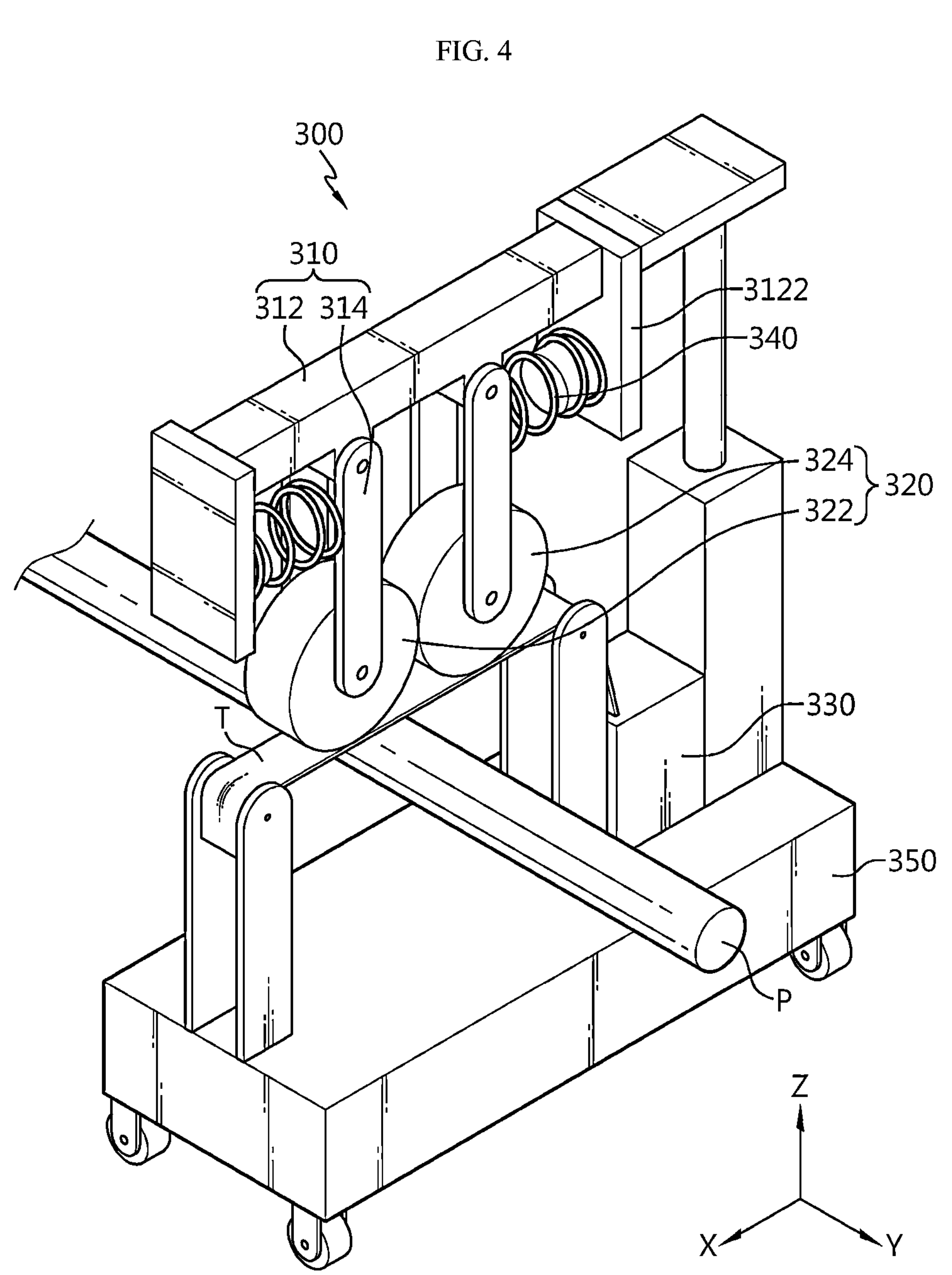
FIG. 4 is a view showing a taping module provided in the jig device of FIG. 1.

FIG. 1 is a view showing the overall shape of a jig device 10 according to an embodiment of the present disclosure, FIG. 2 is a view showing a coating module 100 provided in the jig device 10 of FIG. 1. FIG. 3 is a view showing a cutting module 200 provided in the jig device 10 of FIG. 1, and FIG. 4 is a view showing a taping module 300 provided in the jig device 10 of FIG. 1.

In the embodiment of the present disclosure, the X-axis direction shown in the drawing may mean the horizontal direction of the workpiece P to be described later, the Y-axis direction may mean the longitudinal direction (work progress direction) of the workpiece P perpendicular to the X-axis direction on a horizontal plane (XY plane), and the Z-axis direction may mean a vertical direction perpendicular to both the X-axis direction and the Y-axis direction.

Referring to FIGS. 1 to 4, a jig device 10 according to an embodiment of the present disclosure may include a coating module 100, a cutting module 200, and a taping module 300.

The coating module 100 may be configured to coat the outer surface of the workpiece P with a coating material (not shown. e.g., paint). In an embodiment, the workpiece P may be a pipe, a tube, a cable, or the like. In addition, the workpiece P may be used in a battery pack including at least one secondary battery. Also, the workpiece P may be supplied to the jig device 10 at a constant speed through a separate workpiece supply device.

More specifically, the coating module 100 may include a cylinder unit 120 and a spray unit 140.

The cylinder unit 120 may be connected to a coating material supply unit provided outside to receive the coating material and provide a pumping force for spraying the coating material on the outer surface of the workpiece P to the spray unit 140.

The spray unit 140 may receive a coating material from the cylinder unit 120 and spray the coating material on the outer surface of the workpiece P. In addition, the spray unit 140 may be coupled to one side (e.g., an upper portion) of the cylinder unit 120.

The cutting module 200 may be configured to cut the workpiece P.

Specifically, the cutting module 200 may include a first cutting unit 220 and a second cutting unit 240.

The first cutting unit 220 may be disposed on the lower side of the workpiece P and particularly, may be connected to the ground. In addition, the second cutting unit 240 may be disposed on the upper side of the workpiece P. In this state, the first cutting unit 220 and the second cutting unit 240 may be driven in a vertical direction, respectively, to cut the workpiece P disposed between the first cutting unit 220 and the second cutting unit 240 in a vertical direction. Meanwhile, the front ends of the first cutting unit 220 and the second cutting unit 240 may be formed sharply to enable cutting of the workpiece P.

The taping module 300 may be configured to tape the outer surface of the workpiece P. In this case, the taping module 300 may be configured to tape the outer surface of the workpiece P with a tape T. As an example, the tape T may be a sealing, a label, or the like.

The jig device 10 of the present disclosure may be illustratively arranged in the order of the coating module 100, the cutting module 200, and the taping module 300 when viewed in the longitudinal direction (work progress direction) of the workpiece P, as shown in FIG. 1.

Illustratively, if the workpiece P is formed of weaving, there is a high probability that the workpiece P is unwound and damaged when the woven workpiece P is cut by the cutting module 200. To prevent this, in the jig device 10 of the present disclosure, the coating module 100 may be disposed closer to the workpiece supply device than the cutting module 200 when viewed in the longitudinal direction of the workpiece P. Also, the coating material may be coated on the outer surface of the workpiece P before cutting the workpiece P by this arrangement structure. Accordingly, it is possible to prevent damage to the woven workpiece P.

Also, in FIG. 1, the jig device 10 is arranged in the order of the coating module 100, the cutting module 200, and the taping module 300 when viewed in the longitudinal direction of the workpiece P, but is not limited thereto, and it may also be arranged in the order of the cutting module 200, the coating module 100, and the taping module 300. That is, after the cutting of the workpiece P by the cutting module 200, the coating of the workpiece P by the coating module 100 and the taping of the workpiece P by the taping module 300 may be performed sequentially.

In addition, the jig device 10 may also be arranged in the order of the taping module 300, the coating module 100, and the cutting module 200 when viewed in the longitudinal direction of the workpiece P. That is, after the taping of the workpiece P by the taping module 300, the coating of the workpiece P by the coating module 100 and the cutting of the workpiece P by the cutting module 200 may be performed sequentially.

According to this embodiment of the present disclosure, it is possible to perform the cutting, coating, and taping processes of the workpiece P in an integrated manner during the process of processing the workpiece P, and the work completeness of the workpiece P may be improved.

Hereinafter, the coating module 100, the cutting module 200, and the taping module 300 described above will be described in more detail.

Referring to FIGS. 1 to 4 again, the coating module 100 may be configured to coat the outer surface of the workpiece P with a certain amount of coating material at regular intervals. In addition, the taping module 300 may be configured to tape the outer surface of the workpiece P with the tape T at regular intervals.

Illustratively, the cylinder unit 120 of the coating module 100 may adjust the pumping force of the coating material so that the discharge pressure at the spray unit 140 remains constant so as to spray a certain amount of coating material on the outer surface of the workpiece P.

As described above, the workpiece P may be supplied to the jig device 10 at a constant speed through a workpiece supply device. Illustratively, the coating module 100 and the taping module 300 may perform operations while moving at regular intervals with respect to the workpiece P. or may perform operations while remaining in place. At this time, when the coating module 100 and the taping module 300 perform operations while moving with respect to the workpiece P, the coating module 100 and the taping module 300 may be configured to move at a constant speed with respect to the workpiece P. Meanwhile, the configuration of moving the coating module 100 and the taping module 300 with respect to the workpiece P will be described in more detail in the related description to be described later.

According to this embodiment of the present disclosure, the processing process of the workpiece P may be automated by the jig device 10, and the work completeness of the workpiece P may be improved.

Referring to FIGS. 1 and 2 again, the coating module 100 may be configured to move along the workpiece P so as to coat the outer surface of the workpiece P with a coating material.

Specifically, the coating module 100 may further include a first position moving unit 160. The first position moving unit 160 may be disposed on the ground.

The first position moving unit 160 may move the above-described cylinder unit 120 and spray unit 140 along the workpiece P. As shown in FIGS. 1 and 2, the first position moving unit 160 may be a structure including wheels for driving the cylinder unit 120 and the spray unit 140 along the workpiece P. In this case, the wheels of the first position moving unit 160 may be driven by a separate motor. Meanwhile, the first position moving unit 160 may move the cylinder unit 120 and the spray unit 140 in at least one of the longitudinal direction and the horizontal direction of the workpiece P. Also, the first position moving unit 160 may include a separate actuator driven in a vertical direction to drive the cylinder unit 120 and the spray unit 140 in a vertical direction. In addition, the cylinder unit 120 may be coupled to one side (e.g., an upper portion) of the first position moving unit 160.

Also, the first position moving unit 160 may move the cylinder unit 120 and the spray unit 140 at regular intervals in the longitudinal direction of the workpiece P.

According to this embodiment of the present disclosure, the coating process may be performed by the coating module 100 at a location preferred by the operator, and a rapid supplementary coating work may be performed for the portion where the coating of the coating material is insufficient on the outer surface of the workpiece P.

Figure 5:
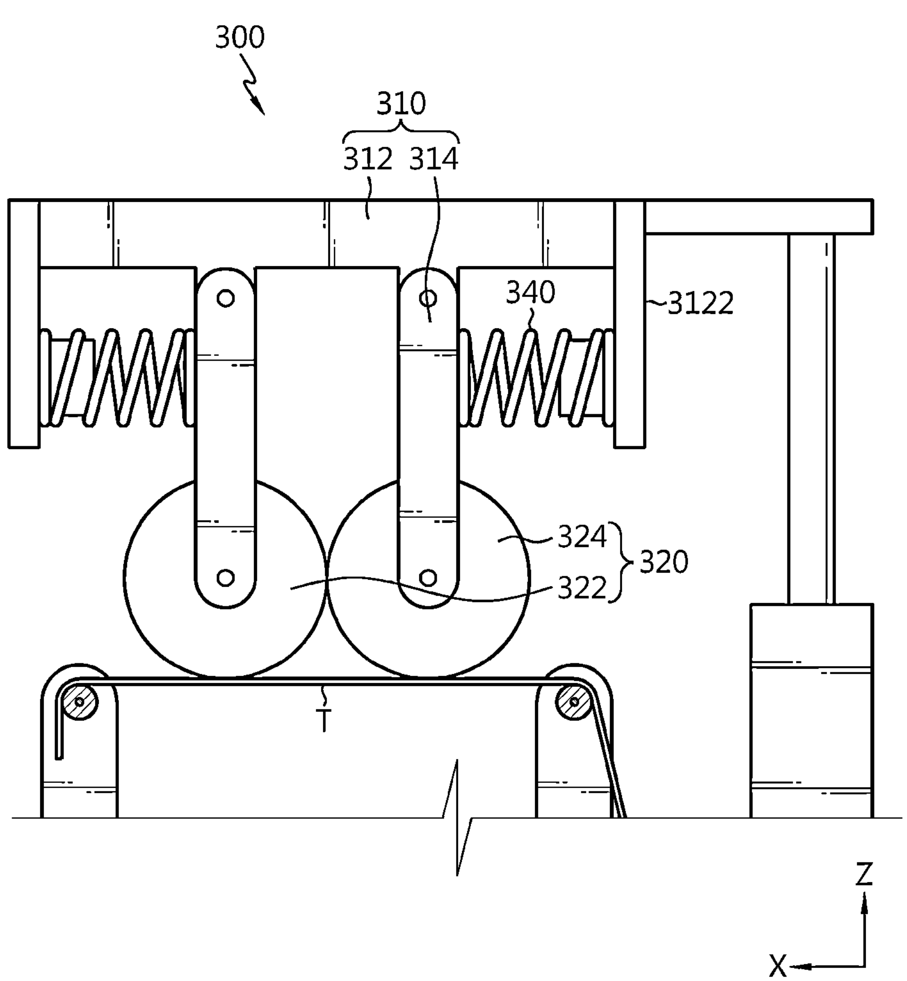
FIG. 5 is a front view showing a portion of the taping module of FIG. 4.

FIG. 5 is a front view showing a portion of the taping module 300 of FIG. 4.

Referring to FIGS. 1 and 5, the taping module 300 may include a support frame 310, a pressure roller 320, and a tape supply unit 330.

The support frame 310 may be configured to support the pressure roller 320.

The pressure roller 320 may be coupled to the support frame 310 and may be configured to press the workpiece P so that the tape T is taped to the outer surface of the workpiece P. Specifically, the pressure roller 320 may be configured to be axially coupled to the support frame 310 to rotate.

The tape supply unit 330 may be configured to supply the tape T to the pressure roller 320.

In an embodiment, the tape supply unit 330 may supply the tape T to the lower surface of the pressure roller 320. In this case, the tape T supplied by the tape supply unit 330 may be disposed to be in contact with the lower surface of the pressure roller 320. Also, the support frame 310 may move the pressure roller 320 toward the workpiece P side by being driven up and down in a state where the tape T is supplied to the lower surface of the pressure roller 320.

In this way, by the movement of the support frame 310 toward the workpiece P side and the pressing force of the pressure roller 320, the workpiece P primarily wrapped with the tape T on its outer surface may be secondarily pressed by the pressure roller 320.

According to this embodiment of the present disclosure, the taping process is performed through the pressure roller 320 supported by the support frame 310, and thus the vibration of the pressure roller 320 may be minimized to perform a more stable taping process.

Figure 6:
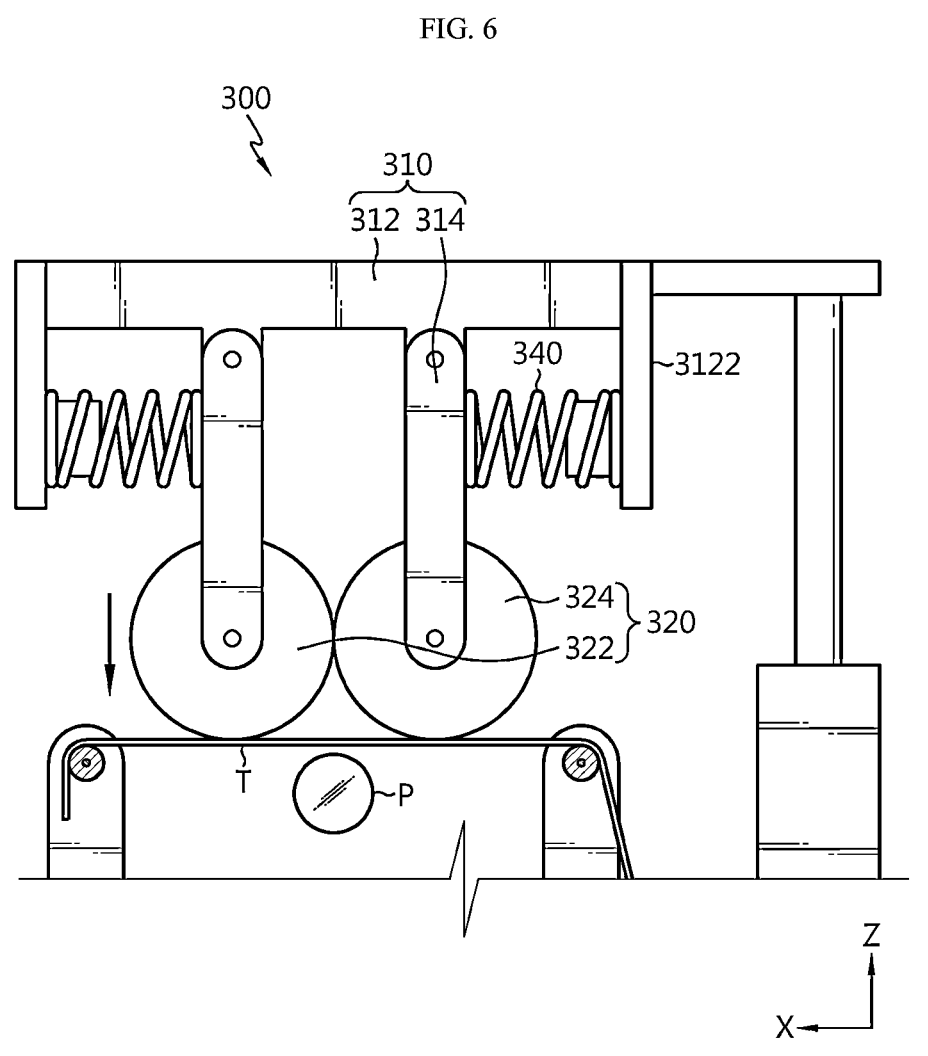
Figure 7:
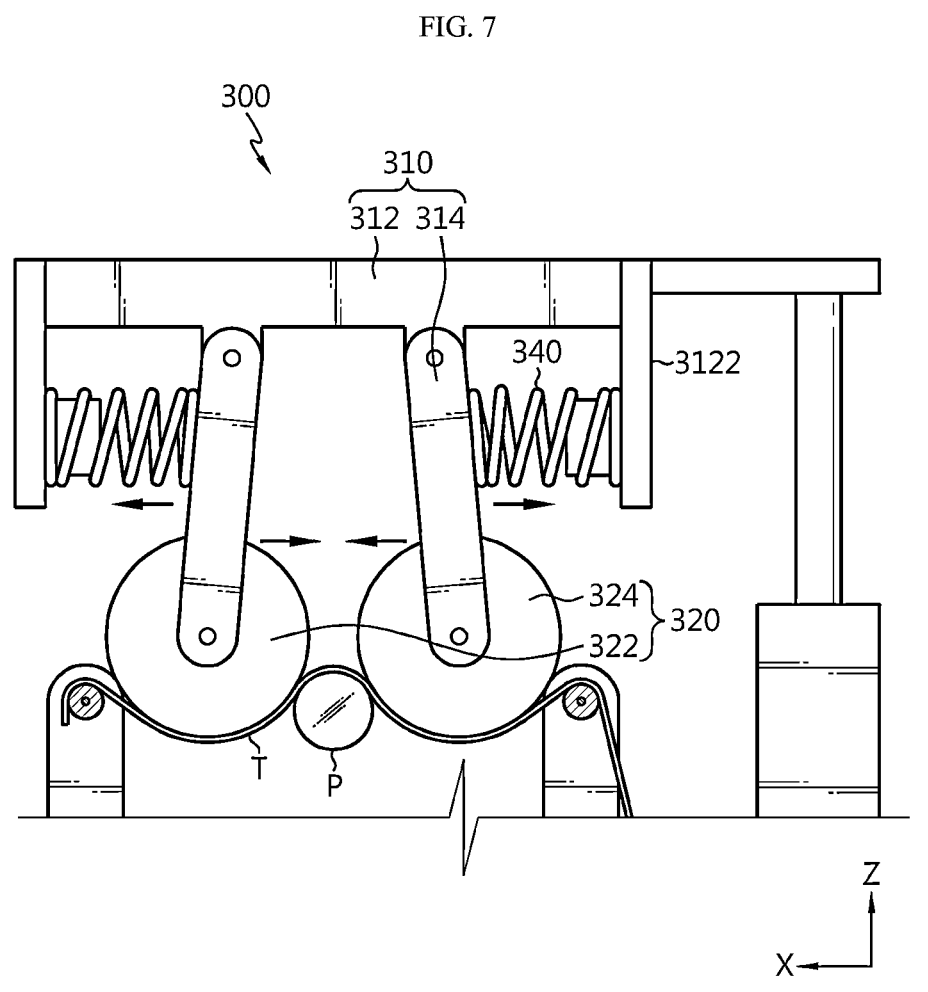
Figure 8:
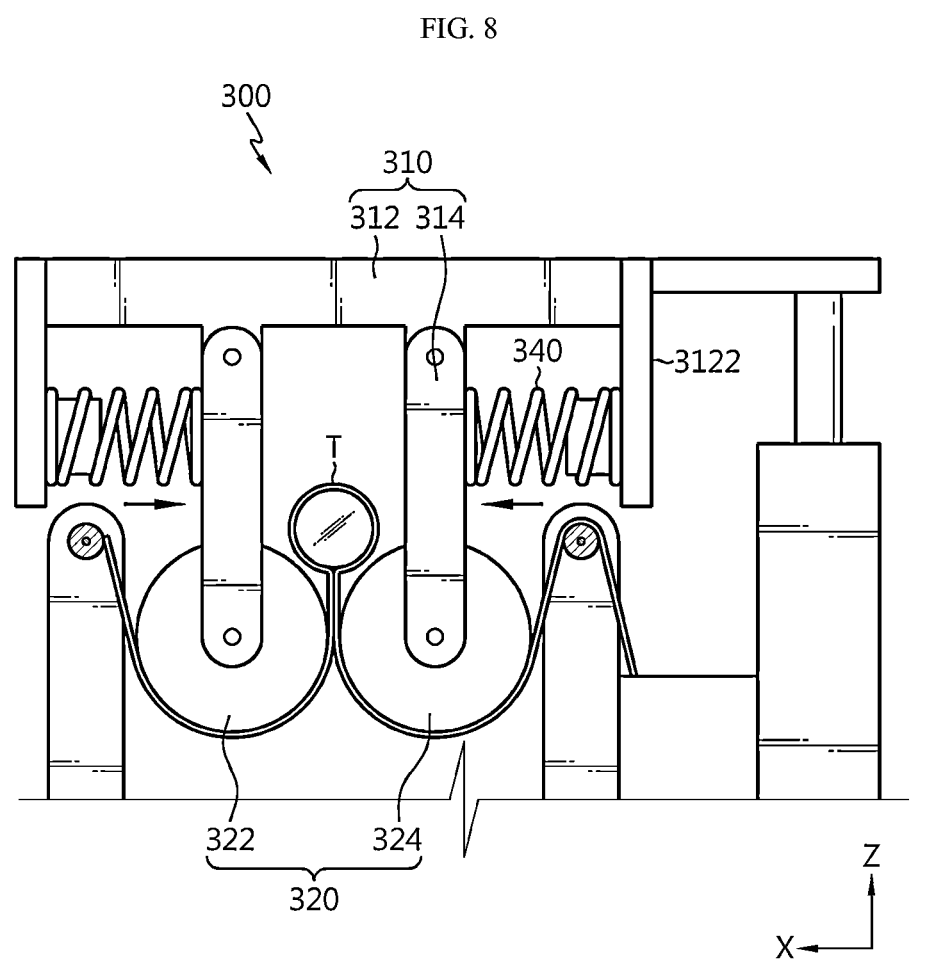

FIGS. 6 to 8 are views showing a process of taping the workpiece P by the taping module 300 of FIG. 4. Specifically, FIG. 6 is a view showing a state in which the support frame 310 moves toward the workpiece P side, FIG. 7 is a view showing a state in which the pressure roller 320 presses the workpiece P primarily wrapped with the tape T on its outer surface, and FIG. 8 is a view showing a state in which the tape T is taped on the outer surface of the workpiece P by the pressing force of the pressure roller 320.

Referring to FIGS. 5 to 8, the pressure roller 320 may include a first roller 322 and a second roller 324.

The first roller 322 may be coupled to the support frame 310.

The second roller 324 may be disposed to face the first roller 322 in the horizontal direction (X-axis direction) of the workpiece P. Also, the second roller 324 may be coupled to the support frame 310.

Referring to FIG. 6, the support frame 310 may move the pressure roller 320 toward the workpiece P side by being driven up and down in a state where the tape T is supplied to the lower surface of the pressure roller 320.

Next, referring to FIG. 7, the first roller 322 and the second roller 324 may be configured to press the workpiece P located between the first roller 322 and the second roller 324 in the horizontal direction of the workpiece P. In this case, the outer surface of the workpiece P may be taped with the tape T by the pressing force of the first roller 322 and the second roller 324 between the first roller 322 and the second roller 324.

Also referring to FIG. 8, the outer surface of the workpiece P passing between the first roller 322 and the second roller 324 may be uniformly taped with the tape T.

According to this embodiment of the present disclosure, the workpiece P wrapped with the tape T on its outer surface is pressed through the first roller 322 and the second roller 324 on both sides in the horizontal direction of the workpiece P, so that a more stable taping process may be performed.

Referring to FIGS. 5 to 8 again, the support frame 310 may include a first frame 312 and a second frame 314.

The first frame 312 may be formed by extending in the horizontal direction of the workpiece P.

The second frame 314 is formed by extending in a vertical direction to be coupled to one side (e.g., a lower portion) in the vertical direction of the first frame 312, and may be configured to support the pressure roller 320. In this case, the second frame 314 may be provided as a pair of frames disposed to face each other in the horizontal direction of the workpiece P, and may be rotatably coupled to the first frame 312. Also, the first roller 322 and the second roller 324 described above may be coupled to the pair of frames, respectively.

Specifically, the first frame 312 may further include an extension portion 3122 formed by extending in a vertical direction. In this case, the extension portion 3122 may be formed by extending downward from the first frame 312, and may be disposed to be spaced apart from the second frame 314 in the horizontal direction of the workpiece P.

In addition, between the extension portion 3122 and the second frame 314, an elastic support unit 340 may be provided in the horizontal direction of the workpiece P. As an example, the elastic support unit 340 may be a spring, but is not limited thereto.

The elastic support unit 340 may be configured to elastically support the second frame 314 in the horizontal direction of the workpiece P. Specifically, as shown in FIG. 7, when the pressure roller 320 presses the workpiece P in the horizontal direction of the workpiece P, the elastic support unit 340 may be compressed to a predetermined length in the horizontal direction of the workpiece P. In addition, as shown in FIG. 8, after the workpiece P taped on its outer surface with the tape T passes through the pressure roller 320, the elastic support unit 340 may return to its original state and elastically support the second frame 314 in the horizontal direction of the workpiece P. In this case, the support frame 310 including the first frame 312 and the second frame 314 may be made of a material having elasticity.

According to this embodiment of the present disclosure, damage to the support frame 310 may be prevented during the taping process of the workpiece P. and a more stable taping process may be performed.

Referring to FIGS. 1 and 4 again, the support frame 310 may be configured to move in three axial directions of the workpiece P.

Specifically, the above-described taping module 300 may further include a second position moving unit 350. The second position moving unit 350 may be disposed on the ground.

The second position moving unit 350 may move the support frame 310, the pressure roller 320, and the tape supply unit 330 described above in three axial directions of the workpiece P. As shown in FIGS. 1 and 4, the second position moving unit 350 may be a structure including wheels and actuators for driving the support frame 310, the pressure roller 320, and the tape supply unit 330 in three axial directions of the workpiece P. In this case, the wheels and actuators of the second position moving unit 350 may be driven by a separate motor. Meanwhile, the second position moving unit 350 may move the support frame 310, the pressure roller 320, and the tape supply unit 330 in at least one of the longitudinal direction, horizontal direction, and vertical direction of the workpiece P. In addition, the support frame 310 may be connected to the second position moving unit 350.

Also, the second position moving unit 350 may move the support frame 310 at regular intervals in the longitudinal direction of the workpiece P.

According to this embodiment of the present disclosure, the taping process may be performed by the taping module 300 at a location preferred by the operator, and a rapid supplementary taping work may be performed for the portion where the taping is insufficient on the outer surface of the workpiece P.

Figure 9:
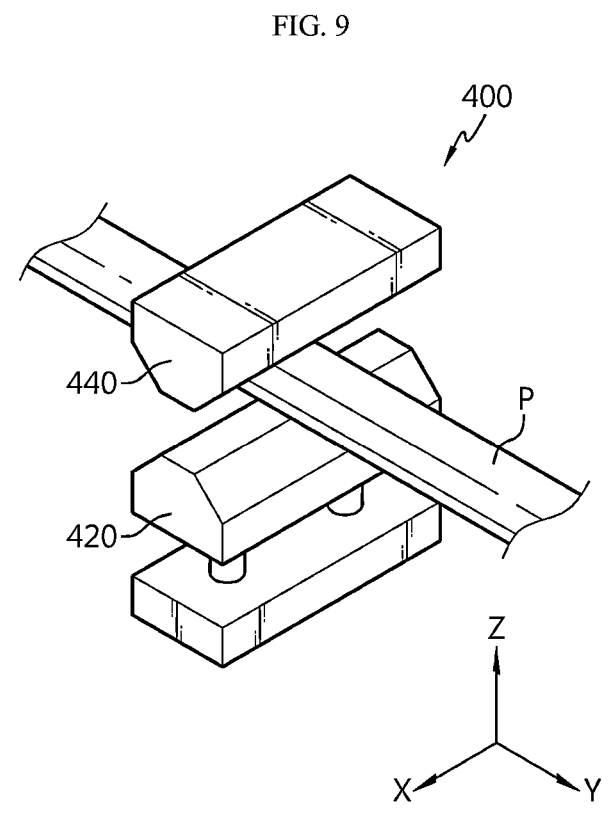

FIG. 9 is a view showing a clamping module 400 provided in the jig device 10 of FIG. 1.

Referring to FIGS. 1 and 9, the jig device 10 may further include a clamping module 400.

The clamping module 400 may be configured to fix the position of the workpiece P supplied to the jig device 10 at a constant speed. In this case, the clamping module 400 may be disposed closer to the workpiece supply device than the coating module 100, the cutting module 200, and the taping module 300 when viewed in the longitudinal direction (work progress direction) of the workpiece P.

Specifically, the clamping module 400 may include a first clamp 420 and a second clamp 440.

The first clamp 420 is disposed on the lower side of the workpiece P, and may also be particularly disposed on the ground. In addition, the second clamp 440 may be disposed on the upper side of the workpiece P. In this state, the first clamp 420 and the second clamp 440 may be configured to be driven in a vertical direction, respectively, to fix the position of the workpiece P disposed between the first clamp 420 and the second clamp 440 in a vertical direction. At this time, the second clamp 440 may be driven through hydraulic pressure or pneumatic pressure.

In this case, the coating module 100 may be configured to coat the outer surface of the workpiece P with a coating material in a state where the position of the workpiece P is fixed by the clamping module 400. In addition, the taping module 300 may be configured to tape the outer surface of the workpiece P with the tape T in a state where the position of the workpiece P is fixed by the clamping module 400.

According to this embodiment of the present disclosure, the shaking of the workpiece P is minimized by the clamping module 400, and thus a more stable coating process and taping process may be performed.

Meanwhile, the clamping module 400 may also be configured to move the workpiece P at a constant speed in a work progress direction by having a separate motor. Accordingly, the coating module 100 may coat the outer surface of the workpiece P with a coating material at regular intervals. In addition, the taping module 300 may tape the outer surface of the workpiece P with the tape T at regular intervals.

Figure 10:
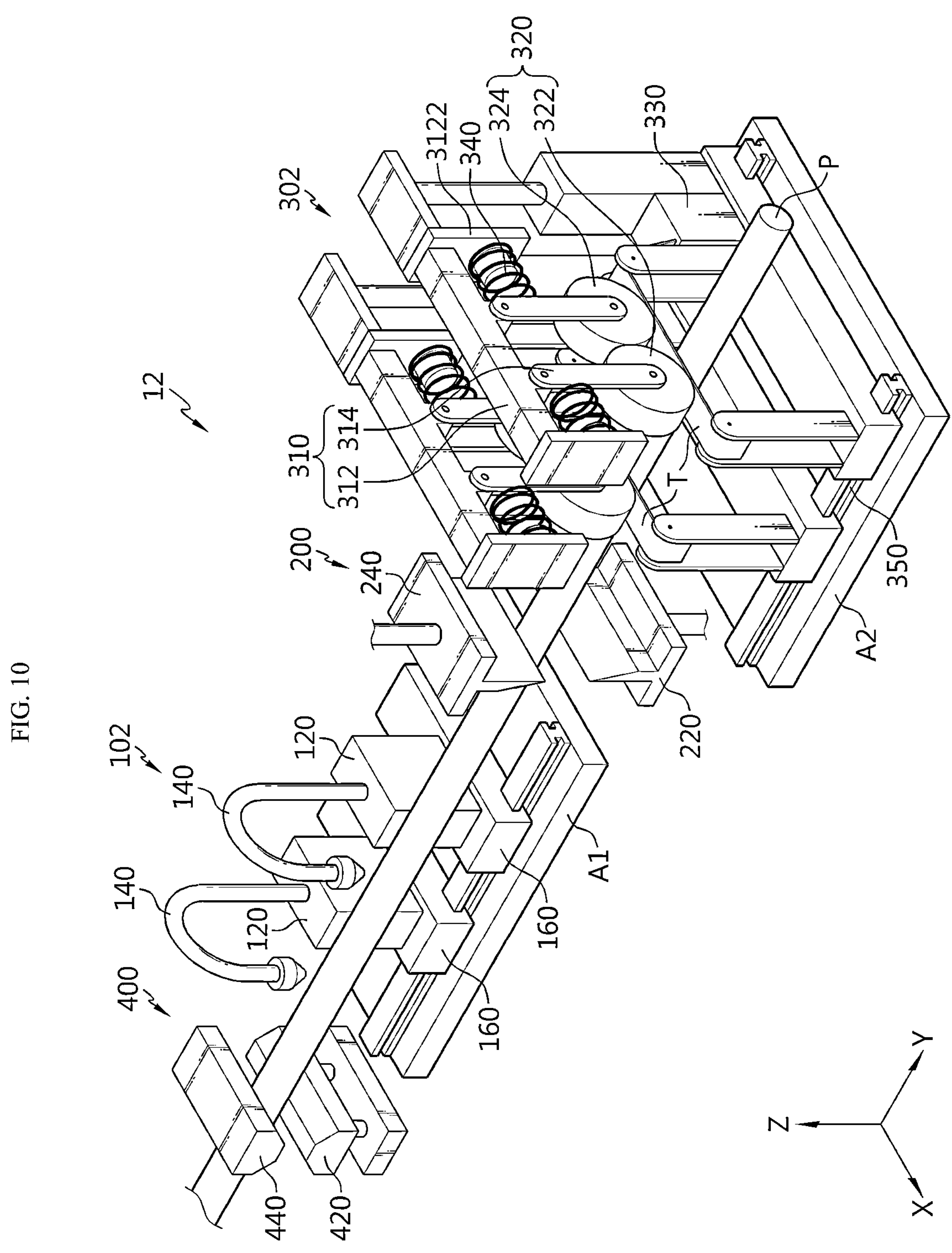
FIG. 10 is a view showing a jig device according to a second embodiment of the present disclosure.

FIG. 10 is a view showing a jig device 12 according to a second embodiment of the present disclosure.

Referring to FIG. 10, a jig device 12 according to a second embodiment of the present disclosure is illustrated. Since the jig device 12 according to this embodiment is similar to the jig device 10 of the previous embodiment, a redundant description of configurations substantially the same as or similar to those of the previous embodiment will be omitted, and hereinafter, differences from the previous embodiment will be mainly described.

Referring to FIG. 10, the coating module 102 and the taping module 302 provided in the jig device 12 may be disposed in plurality along the longitudinal direction (Y-axis direction) of the workpiece P, respectively.

In this case, the distance between the plurality of coating modules 102 may be configured to be mutually adjustable. More specifically, the distance between the plurality of coating modules 102 may be mutually adjusted in the longitudinal direction (Y-axis direction) of the workpiece P. At this time, the distance between the plurality of coating modules 102 may be mutually adjusted according to the length of the workpiece P. In particular, the distance between the plurality of coating modules 102 may also be adjusted at the same interval.

In addition, the distance between the plurality of taping modules 302 may be configured to be mutually adjustable. More specifically, the distance between the plurality of taping modules 302 may be mutually adjusted in the longitudinal direction (Y-axis direction) of the workpiece P. At this time, the distance between the plurality of taping modules 302 may be mutually adjusted according to the length of the workpiece P. In particular, the distance between the plurality of taping modules 302 may also be adjusted at the same interval.

According to the jig device 12 according to this embodiment, the coating process and the taping process may be performed at a plurality of positions of the workpiece P. and a supplementary work may be performed more rapidly for the portion where the coating process and the taping process are insufficient on the outer surface of the workpiece P.

Specifically, the jig device 12 according to this embodiment may further include a first guide unit A1 and a second guide unit A2.

The first guide unit A1 may be configured to guide the movement of the above-described first position moving unit 160 in the longitudinal direction of the workpiece P. As an example, the first guide unit A1 may be a linear motion guide (LM guide) and may be formed by extending in the longitudinal direction of the workpiece P. In this case, the first guide unit A1 may also be disposed on the ground.

The second guide unit A2 may be configured to guide the movement of the above-described second position moving unit 350 in the longitudinal direction of the workpiece P. As an example, the second guide unit A2 may be a linear motion guide (LM guide) and may be formed by extending in the longitudinal direction of the workpiece P. In this case, the second guide unit A2 may also be disposed on the ground.

Accordingly, the movement of the coating module 102 and the taping module 302 in the longitudinal direction of the workpiece P may be more stable. Therefore, it is possible to minimize a decrease in the completeness of the coating process and the taping process due to vibration generated by the movement of the coating module 102 and the taping module 302. In addition, the adjustment of mutual interval between the plurality of coating modules 102 and the plurality of taping modules 302 described above in the longitudinal direction of the workpiece P may be made more stably.

Figure 11:
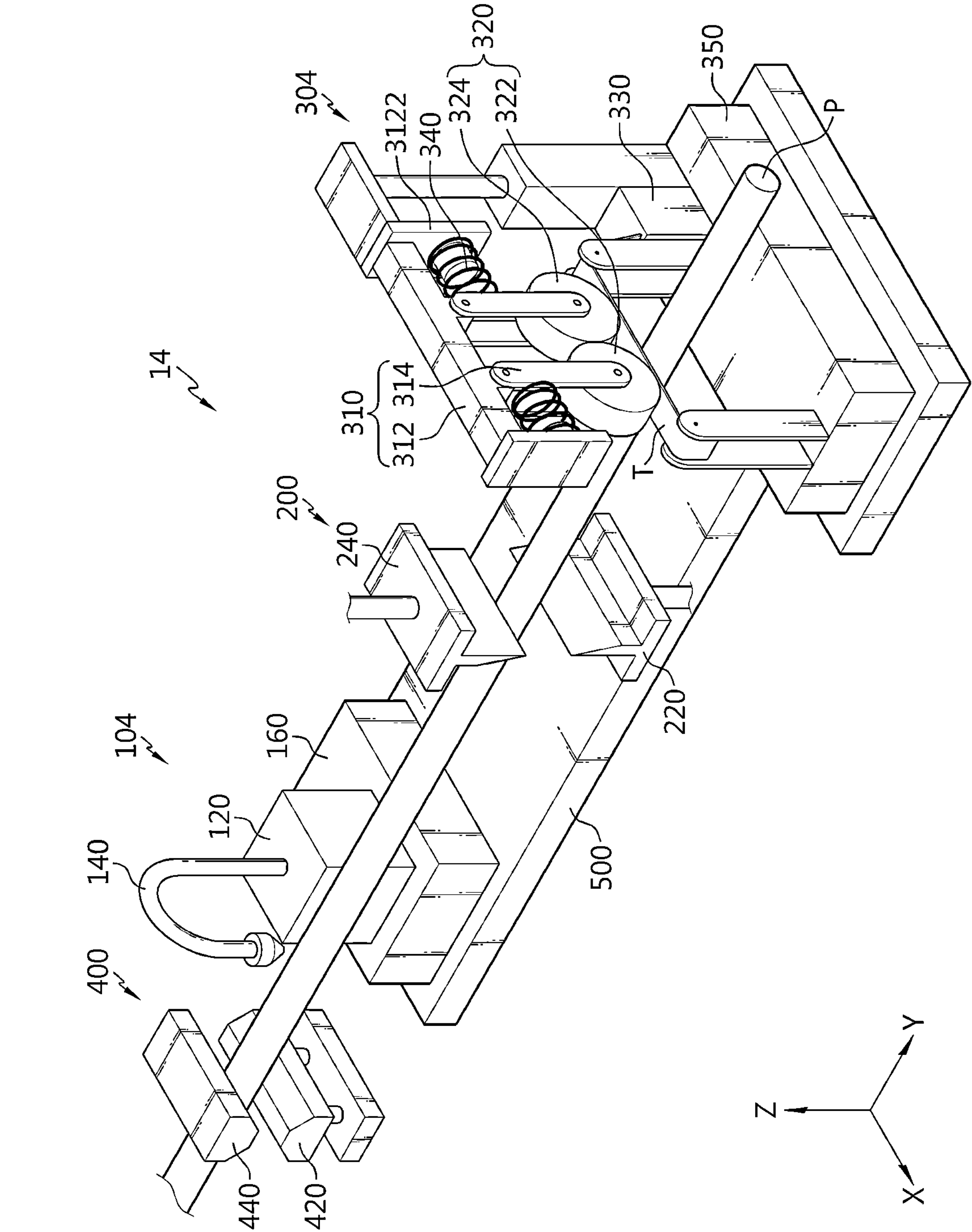
FIG. 11 is a view showing a jig device according to a third embodiment of the present disclosure.

FIG. 11 is a view showing a jig device 14 according to a third embodiment of the present disclosure.

Referring to FIG. 11, a jig device 14 according to a third embodiment of the present disclosure is illustrated. Since the jig device 14 according to this embodiment is similar to the jig device 10 of the previous embodiment, a redundant description of configurations substantially the same as or similar to those of the previous embodiment will be omitted, and hereinafter, differences from the previous embodiment will be mainly described.

Referring to FIG. 11, the jig device 14 may further include a base module 500.

The base module 500 may be configured to support the coating module 104 and the taping module 304 provided in the jig device 14 with respect to the ground. That is, the coating module 104 and the taping module 304 may be integrally disposed on the base module 500 disposed on the ground. In the embodiment shown in FIG. 11, the first position moving unit 160 and the second position moving unit 350 may be configured to be driven only in a vertical direction, but is not limited thereto. Also, the above-described first guide unit A1 and second guide unit A2 may also be located on the base module 500.

According to the jig device 14 according to this embodiment, the coating module 104 and the taping module 304 may be integrally disposed on the base module 500, and thus the overall vibration of the jig device 14 may be minimized compared to the case where the coating module 104 and the taping module 304 are each separately supported on the ground.

Figure 12:
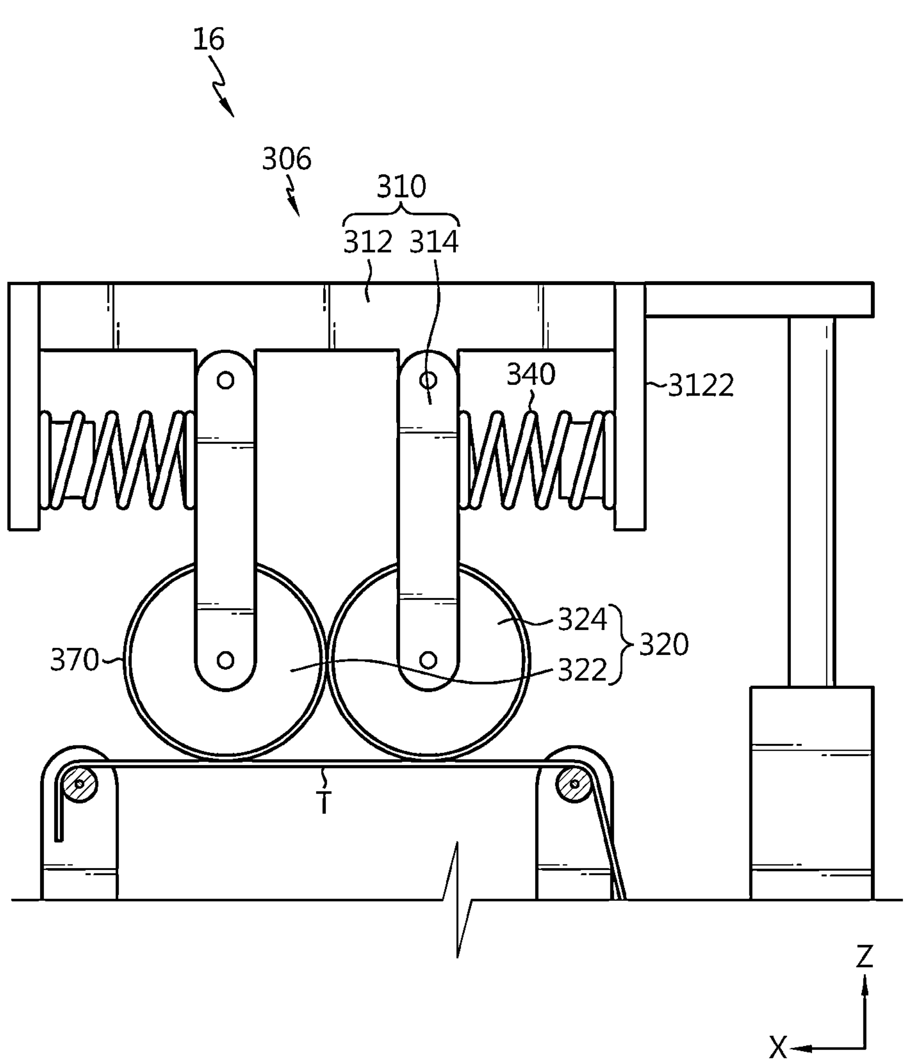
FIG. 12 is a view showing a jig device according to a fourth embodiment of the present disclosure.

FIG. 12 is a view showing a jig device 16 according to a fourth embodiment of the present disclosure.

Referring to FIG. 12, a jig device 16 according to a fourth embodiment of the present disclosure is illustrated. Since the jig device 16 according to this embodiment is similar to the jig device 10 of the previous embodiment, a redundant description of configurations substantially the same as or similar to those of the previous embodiment will be omitted, and hereinafter, differences from the previous embodiment will be mainly described.

Referring to FIG. 12, the taping module 306 provided in the jig device 16 may include a buffer pad 370.

The buffer pad 370 may be provided on the outer surface of the pressure roller 320. The buffer pad 370 may buffer the pressing force applied to the workpiece P when the pressure roller 320 presses the workpiece P. Accordingly, damage to the workpiece P may be minimized during the process of taping the workpiece P.

Figure 13:
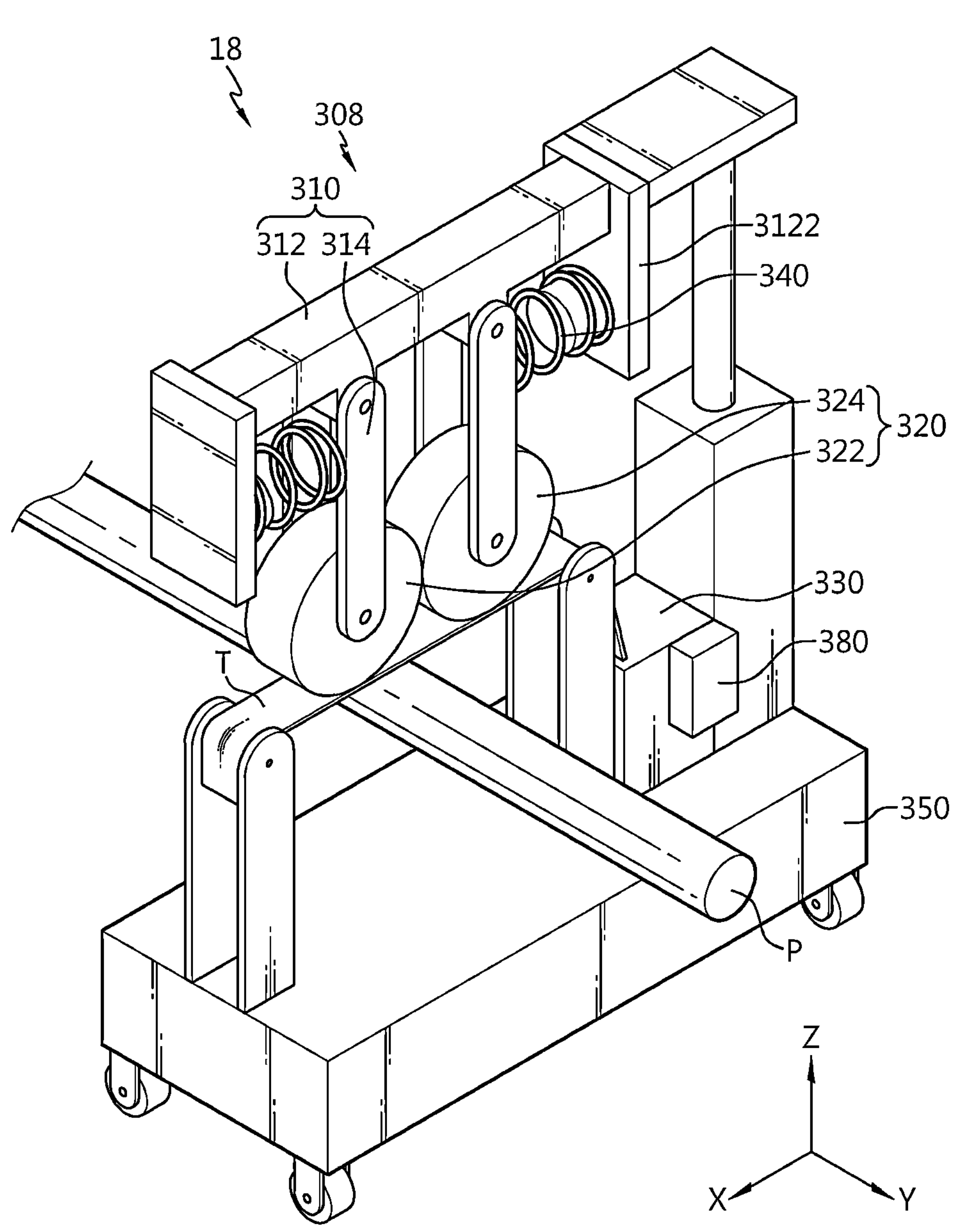
FIG. 13 is a view showing a jig device according to a fifth embodiment of the present disclosure.

FIG. 13 is a view showing a jig device 18 according to a fifth embodiment of the present disclosure.

Referring to FIG. 13, a jig device 18 according to a fifth embodiment of the present disclosure is illustrated. Since the jig device 18 according to this embodiment is similar to the jig device 10 of the previous embodiment, a redundant description of configurations substantially the same as or similar to those of the previous embodiment will be omitted, and hereinafter, differences from the previous embodiment will be mainly described.

Referring to FIG. 13, the taping module 308 provided in the jig device 18 may include a tension control unit 380.

In the jig device 18 according to this embodiment, the tension control unit 380 may be configured to adjust the tension of the tape T supplied to the pressure roller 320. The tension control unit 380 may be connected to the tape supply unit 330 and may be configured to adjust the tension of the tape T by supplying pneumatic pressure to the tape supply unit 330, but is not limited thereto.

According to this tension control unit 380, the tape T may be primarily adhered to the outer surface of the workpiece P more tightly before the pressure roller 320 presses the workpiece P, thereby further improving the completeness of the taping process.

As described above, according to the embodiment of the present disclosure, it is possible to perform the cutting, coating, and taping processes of the workpiece P in an integrated manner during the process of processing the workpiece P, and the work completeness of the workpiece P may be improved. In addition, the process of processing the workpiece P may be automated by the jig devices 10, 12, 14, 16, 18.

While the present disclosure has been hereinabove described with regard to a limited number of embodiments and drawings, the present disclosure is not limited thereto and it is obvious to those skilled in the art that a variety of modifications and changes may be made thereto within the technical aspects of the present disclosure and the equivalent scope of the appended claims.

Meanwhile, the terms indicating directions as used herein such as upper, lower, left, right, front, and rear are used for convenience of description only, and it is obvious to those skilled in the art that the term may change depending on the position of the stated element or an observer.

EXPLANATION OF REFERENCE SIGNS

10, 12, 14, 16, 18: jig device
100, 102, 104: coating module
200: cutting module
300, 302, 304, 306, 308: taping module
310: support frame
312: first frame
3122: extension portion
314: second frame
320: pressure roller
322: first roller
324: second roller
330: tape supply unit
340: elastic support unit
370: buffer pad
380: tension control unit
400: clamping module
500: base module
P: workpiece
T: tape

What is claimed is:

1. A jig device comprising:
a coater configured to coat an outer surface of a workpiece with a coating material;
a cutter configured to cut the workpiece; and
a taper downstream of the cutter in a traveling direction of the workpiece, the taper configured to tape the outer surface of the workpiece.

2. The jig device according to claim 1, wherein the coater is configured to coat the outer surface of the workpiece with a certain amount of the coating material at regular intervals, and
wherein the taper is configured to tape the outer surface of the workpiece with a tape at regular intervals.

3. The jig device according to claim 1, wherein the coater is configured to move along the workpiece to coat the outer surface of the workpiece with the coating material.

4. The jig device according to claim 1, wherein the taper comprises:
a support frame;
a pressure roller coupled to the support frame, the pressure roller being configured to press the workpiece so that a tape is taped to the outer surface of the workpiece; and
a tape supplier configured to supply the tape to the pressure roller.

5. The jig device according to claim 4, wherein the pressure roller comprises:
a first roller; and
a second roller disposed to face the first roller in a horizontal direction of the workpiece, and
wherein the first roller and the second roller are configured to press the workpiece positioned between the first roller and the second roller in the horizontal direction of the workpiece.

6. The jig device according to claim 4, wherein the support frame comprises:
a first frame, the first frame including an extension portion extending in a vertical direction; and
a second frame coupled to the first frame in the vertical direction, the second frame being configured to support the pressure roller, and
wherein the taper further includes an elastic support provided in a horizontal direction of the workpiece between the extension portion and the second frame, the elastic support being configured to elastically support the second frame in the horizontal direction of the workpiece.

7. The jig device according to claim 4, wherein the support frame is configured to move in three axial directions of the workpiece.

8. The jig device according to claim 1, further comprising a clamper configured to fix a position of the workpiece,
wherein the coater is configured to coat the outer surface of the workpiece with the coating material in a state where the position of the workpiece is fixed, and
wherein the taper is configured to tape the outer surface of the workpiece with a tape in a state where the position of the workpiece is fixed.

9. The jig device according to claim 1, wherein the coater and the taper are respectively disposed in plurality along the traveling direction of the workpiece,
wherein a distance between the plurality of coaters is configured to be mutually adjustable, and
wherein a distance between the plurality of tapers is configured to be mutually adjustable.

10. The jig device according to claim 1, further comprising a base configured to support the coater and the taper with respect to a ground.

11. The jig device according to claim 4, wherein the taper further comprises a buffer pad provided on an outer surface of the pressure roller.

12. The jig device according to claim 4, wherein the taper further comprises a tension controller configured to adjust a tension of the tape supplied to the pressure roller.

13. The jig device according to claim 1, wherein the coater comprises a sprayer.

14. The jig device according to claim 1, wherein tape extending from the taper is perpendicular to the traveling direction of the workpiece.

15. The jig device according to claim 1, wherein the taper comprises two pressure rollers that are biased together.

16. The jig device according to claim 15, wherein the two pressure rollers are above the taper and move vertically.

17. The jig device according to claim 1, wherein the taper comprises a frame and two pressure rollers pivotally connected to the frame.

18. The jig device according to claim 17, wherein the frame moves vertically.

* * * * *